United States Patent [19]

Mizutani et al.

[11] Patent Number: 4,602,074

[45] Date of Patent: Jul. 22, 1986

[54] CONTACT LENS MATERIAL

[75] Inventors: Yutaka Mizutani; Tatsuo Harata, both of Nagoya; Naokatsu Tanahashi, Gifu, all of Japan

[73] Assignee: Nippon Contact Lens Manufacturing Ltd., Aichi, Japan

[21] Appl. No.: 682,782

[22] Filed: Dec. 18, 1984

[30] Foreign Application Priority Data

Dec. 20, 1983 [JP] Japan .............................. 58-238978
Aug. 23, 1984 [JP] Japan .............................. 59-174177

[51] Int. Cl.$^4$ .................. C08F 220/26; G02C 7/04
[52] U.S. Cl. .................. 526/245; 351/160 R; 351/160 H; 526/264; 526/279
[58] Field of Search .............. 526/279, 245, 264; 351/160 R, 160 H

[56] References Cited

U.S. PATENT DOCUMENTS

| | | | |
|---|---|---|---|
| 4,139,692 | 2/1979 | Tanaka et al. | 526/279 |
| 4,153,641 | 5/1979 | Deichert et al. | 526/279 |
| 4,216,303 | 8/1980 | Novicky | 526/279 |
| 4,246,389 | 1/1981 | LeBoeuf | 526/279 |
| 4,248,989 | 2/1981 | Novicky | 526/279 |
| 4,254,248 | 3/1981 | Friends et al. | 526/279 |
| 4,433,125 | 2/1984 | Ichinohe et al. | 526/279 |
| 4,507,452 | 3/1985 | Foley | 526/279 |
| 4,525,563 | 6/1985 | Shibata et al. | 526/279 |
| 4,535,138 | 8/1985 | Ratkowski et al. | 526/279 |

*Primary Examiner*—Harry Wong, Jr.
*Attorney, Agent, or Firm*—Wyatt, Gerber, Shoup, Scobey and Badie

[57] ABSTRACT

A contact lens material made of an organosiloxane ester copolymer. The organosiloxane is represented by the general formula:

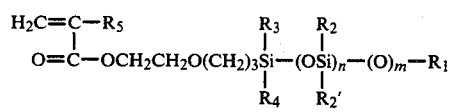

and the ester is composed of $C_1$-$C_{10}$ mono- or multivalent alcohol and methacrylic acid, acrylic acid or itaconic acid. The contact lens is oxygen permeable and substantially free of water-absorption, so that it is easy to handle. It may be worn comfortably for extended period.

5 Claims, 4 Drawing Figures

CONTACT LENS MATERIAL

BACKGROUND OF THE INVENTION

(1) Field of the Invention

The present invention relates to contact lens materials, more specifically to those having excellent oxygen permeability and water wettability, capable of being worn for extended period, and being substantially free of water absorption so that they are easy to handle.

(2) Description of the Prior Art

Contact lenses essentially made of, for example, polymethyl methacrylate have conventionally been in practical use. Polymethyl methacrylate, which is a main ingredient of the contact lenses, is highly advantageous in its excellent optical properties and durability, but it is still disadvantageous in that it cannot be worn continuously for extended period from the viewpoint of corneal physiology, due to its poor oxygen permeability.

In order to avoid the problems of the above-mentioned so-called hard type contact lenses, water-absorbable contact lenses essentially made of poly 2-hydroxyethyl methacrylate were proposed and are in practical use. Such so-called soft type contact lenses have good water affinity so that they can be somewhat comfortably worn, but they do not have sufficient oxygen permeability, making it impossible to wear for a long time. Further, because of their tendency of absorbing water, they are inferior to the hard type contact lenses because they are difficult to handle.

Contact lenses of high water content made essentially of N-vinyl pyrrolidone have been proposed for extended duration wearing. These contact lenses have good water affinity and oxygen permeability, but they have extremely poor mechanical strength due to their high water content, so that they are less durable and extremely difficult to handle.

Further, to improve the above contact lenses essentially made of polymethyl methacrylate, poly 2-hydroxyethyl methacrylate or poly N-vinyl pyrrolidone, those made of silicone rubbers or resins have been proposed. These materials, however, need a surface treatment for imparting water affinity thereto because they are hydrophobic, and the contact lenses thus surface-treated do not have satisfactory durability. As shown in U.S. Pat. Nos. 3808178, 4120570, 4306042 and 4330383, contact lenses made of modified silicone resins have been proposed, but they are not yet satisfactory.

DESCRIPTION OF THE INVENTION

The present inventors have found that copolymer materials comprising organosiloxanes represented by the general formula:

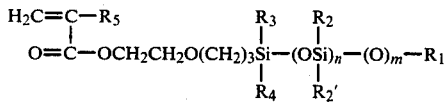

wherein $R_1$ and $R_4$ represents a bond connecting the sites thereof, or $R_1$ is selected from the group consisting of $C_1$–$C_6$ alkyl groups and aromatic groups, and $R_4$ is selected from the group consisting of $C_1$–$C_6$ alkyl groups, aromatic groups and X having the formula:

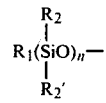

in which $R_2$ and $R_2'$ are selected from the group consisting of $C_1$–$C_6$ alkyl groups and aromatic groups, and n is an integer of 1–3; $R_3$ is selected from the group consisting of $C_1$–$C_6$ alkyl groups, aromatic groups and the X groups; $R_5$ is $CH_3$ or H; and m is 0 or 1, and ester of $C_1$–$C_{10}$ mono- or multi-valent alcohols and an acids selected from the group consisting of methacrylic acid, acrylic acid and itaconic acid have excellent oxygen permeability and water affinity, and are substantially free of water absorption, so that contact lenses made of such materials are easy to handle, have good durability, are capable of being worn comfortably for extended periods, and further having excellent vision correction effects and dimensional stability.

Organosiloxanes represented by the above formula include methacryloxyethoxypropyl pentamethyldisiloxane, acryloxyethoxypropyl pentamethyldisiloxane, methacryloxyethoxypropyl heptamethyltrisiloxane, acryloxyethoxypropyl heptamethyltrisiloxane, methacryloxyethoxypropyl tris(trimethylsiloxy)silane, acryloxyethoxypropyl tris(trimethylsiloxy)silane, methacryloxyethoxypropyl phenyltetramethyldisiloxane, acryloxyethoxypropyl phenyltetramethyldisiloxane, methacryloxyethoxypropyl tribenzyldiethyldisiloxane, acryloxyethoxypropyl tribenzyldiethyldisiloxane, methacryloxyethoxypropyl n-pentylhexamethyltrisiloxane, acryloxyethoxypropyl n-pentylhexamethyltrisiloxane, methacryloxyethoxypropyl di(n-propyl)pentamethyltrisiloxane, acryloxyethoxypropyl di(n-propyl)pentamethyltrisiloxane, methacryloxyethoxypropyl phenyloctamethyltetrasiloxane, acryloxyethoxypropyl phenyloctamethyltetrasiloxane, methacryloxyethoxypropyl isobutyltetramethyldisiloxane, acryloxyethoxypropyl isobutyltetramethyldisiloxane, methacryloxyethoxypropyl methylbis(trimethylsiloxy)silane, acryloxyethoxypropyl methylbis(trimethylsiloxy)silane, acryloxyethoxypropyl methylbis(trimethylsiloxy)silane, methacryloxyethoxypropyl tris(dimethylcyclohexylsiloxy)silane, acryloxyethoxypropyl tris(dimethylcyclohexylsiloxy)silane, methacryloxyethoxypropyl pentamethyldisiloxy bis(trimethylsiloxy)silane, acryloxyethoxypropyl pentamethyldisiloxy bis(trimethylsiloxy)silane, methacryloxyethoxypropyl heptamethylcyclotetrasiloxane, acryloxyethoxypropyl heptamethylcyclotetrasiloxane, methacryloxyethoxypropyl tetramethyltripropylcyclotetrasiloxane and acryloxyethoxypropyl tetramethyltripropylcyclotetrasiloxane.

The esters consisting of $C_1$–$C_{10}$ mono- or multi-valent alcohol and an acid selected from the group consisting of methacrylic acid, acrylic acid and itaconic acid include methyl methacrylate, methyl acrylate, dimethyl itaconate, monomethyl itaconate, ethyl methacrylate, ethyl acrylate, diethyl itaconate, monoethyl itaconate, n-propyl methacrylate, n-propyl acrylate, di(n-propyl)itaconate, mono(n-propyl)itaconate, isopropyl methacrylate, isopropyl acrylate, diisopropyl itaconate, monoisopropyl itaconate, n-butyl methacrylate, n-butyl acrylate, di(n-butyl)itaconate, mono(n-butyl)itaconate, pentyl methacrylate, pentyl acrylate, dipentyl itaconate, monopentyl itaconate, neopentyl methacrylate, neopentyl acrylate, dineopentyl itaconate, mononeopentyl itaconate, n-hexyl methacrylate, n-hexyl acrylate, di(n-hexyl)itaconate, mono(n-hexyl)itaconate, cyclohexyl methacrylate, cyclohexyl acrylate, dicyclohexyl itaconate, monocyclohexyl itaconate, 2-ethylhexyl methacrylate, 2-ethylhexyl acrylate, di(2-ethylhexyl)itaconate, mono(2-ethylhexyl)itaconate, ethylene glycol dimethacrylate, ethylene glycol diacrylate, diethylene glycol dimethacrylate, diethylene glycol diacrylate, triethylene glycol dimethacrylate, triethylene glycol diacrylate, tetraethylene glycol dimethacrylate, tetraethylene glycol diacrylate, 1,3-butanediol dimethacrylate, 1,3-butanediol diacrylate, 1,4-butanediol dimethacrylate, 1,4-butanediol diacrylate, 1,6-hexanediol dimethacrylate, 1,6-hexanediol diacrylate, neopentyl glycol dimethacrylate, neopentyl glycol diacrylate, trimethylolpropane trimethacrylate, trimethylolpropane triacrylate, pentaerythritol tetramethacrylate, pentaerythritol tetraacrylate, ethylene glycol monomethacrylate (2-hydroxyethyl methacrylate), ethylene glycol monoacrylate, diethylene glycol monomethacrylate, diethylene glycol monoacrylate, triethylene glycol monomethacrylate, triethylene glycol monoacrylate, 2-hydroxypropyl methacrylate, 2-hydroxypropyl acrylate, 2-hydroxybutyl methacrylate, 2-hydroxybutyl acrylate, 2-hydroxystyrene methacrylate and 2-hydroxystyrene acrylate.

Among these esters, diesters, triesters, tetraesters, etc. made of multi-valent alcohols and methacrylic acid or acrylic acid are used mainly as a cross-linking component, and monoesters made of monoalcohols and methacrylic acid or acrylic acid or diesters of monoalcohols and itaconic acid are mainly for improving the workability and toughness of the polymer materials. In addition, monoesters of multi-valent alcohols and methacrylic acid or acrylic acid, or monoesters of monoalcohols and itaconic acid are used mainly for improving the water affinity of the polymer materials. In place of the above esters for improving the water affinity, methacrylic acid, acrylic acid, acrylamide, methacrylamide, N-methylol methacrylamide, N-vinyl pyrrolidone, etc. may be used.

Esters made of linear or branched fluoroalkyl or fluoroalkylbenzyl alcohols having 1-20 fluorine atoms and an acid selected from the group consisting of methacrylic acid, acrylic acid and itaconic acid include bis(2,2,2-trifluoroethyl)itaconate, mono(2,2,2-trifluoroethyl)itaconate, bis(2,2,3,3-tetrafluoropropyl)itaconate, mono(2,2,3,3-tetrafluoropropyl)itaconate, bis(2,2,3,3,4,4,5,5-octafluoropentyl)itaconate, mono(2,2,3,3,4,4,5,5-octafluoropentyl)itaconate, bis(1H,1H,2H,2H-heptadecafluorodecyl)itaconate, mono(1H,1H,2H,2H-heptadecafluorodecyl)itaconate, bis(1H,1H-pentadecafluorooctyl)itaconate, mono(1H,1H-pentadecafluorooctyl)itaconate, bis(1H,1H-pentafluoropropyl)itaconate, mono(1H,1H-pentafluoropropyl)itaconate, bis(hexafluoroisopropyl)itaconate, mono(hexafluoroisopropyl)itaconate, bis(1H,1H-heptafluorobutyl)itaconate, mono(1H,1H-heptafluorobutyl)itaconate, bis(o-trifluoromethylbenzyl)itaconate, mono(o-trifluoromethylbenzyl)itaconate, bis(p-trifluoromethylbenzyl)itaconate, mono(p-trifluoromethylbenzyl)itaconate, 2,2,2-trifluoroethyl metacrylate, 2,2,2-trifluoro acrylate, 2,2,3,3-tetrafluoropropyl methacrylate, 2,2,3,3-tetrafluoropropyl acrylate, 2,2,3,3,4,4,5,5-octafluoropentyl methacrylate, 2,2,3,3,4,4,5,5-octafluoropentyl acrylate, 1H,1H,2H,2H-heptadecafluorodecyl methacrylate, 1H,1H,2H,2H-heptadecafluorodecyl acrylate, 1H,1H-pentadecafluorooctyl methacrylate, 1H,1H-pentadecafluorooctyl acrylate, 1H,1H-pentafluoropropyl methacrylate, 1H,1H-pentafluoropropyl acrylate, hexafluoroisopropyl methacrylate, hexafluoroisopropyl acrylate, 1H,1H-heptafluorobutyl methacrylate, 1H,1H-heptafluorobutyl acrylate, o-trifluoromethylbenzyl methacrylate, o-trifluoromethylbenzyl acrylate, p-trifluoromethylbenzyl methacrylate and p-trifluoromethylbenzyl acrylate. These esters serve mainly in cooperation with the organosiloxanes to improve the oxygen permeability of the polymer materials.

The organosiloxane and the ester both constituting the copolymer as a contact lens material are preferably about 5-80 parts by weight and about 95-10 parts by weight. More preferably, 5-80 parts by weight of the organosiloxane may be combined with about 10-95 parts by weight of ester of a monoalcohol and methacrylic acid or acrylic acid and/or the diester of a monoalcohol and itaconic acid. The above combination may further include (A) 50 parts by weight or less of the ester of a fluoroalkyl alcohol or fluoroalkylbenzyl alcohol and methacrylic acid, acrylic acid or itaconic acid (preferably diester when itaconic acid is used);

(B) about 0.5-15 parts by weight of the diester, triester, tetraester etc. of a multi-valent alcohol and methacrylic acid or acrylic acid; or (C) 5-10 parts by weight of the monoester of multi-valent alcohol and methacrylic acid or acrylic acid, the monoester of a monoalcohol and itaconic acid and/or the monoester of fluoroalkyl alcohol or fluoroalkylbenzy alcohol and itaconic acid, one or more of which monoesters may be replaced in part or totally by a hydrophilic monomer such as methacrylic acid; or (D) mixtures thereof.

Added to the above-mentioned monomers is an initiator such as dimethyl-2,2'-azobisisobutyrate, 2-2'-azobis(4-methoxy-2,4-dimethylvaleronitrile), 2,2'-azobis(2,4-dimethylvaleronitrile), 2,2'-Azobisisobutyronitrile, benzoyl peroxide, di(tert-butyl)-peroxide, isobutyl peroxide, diisobutylperoxydicarbonate, methylethylketone peroxide and the monomers are radical-polymerized in a usual way.

DESCRIPTION OF THE PREFERRED EMBODIMENTS

The organosiloxane, for instance, methacryloxyethoxypropyl tris(trimethylsiloxy)silane is prepared as follows:

First, methacrylic acid is reacted with allyloxyethanol in the presence of catalytic of sulfuric acid by a usual esterification method to form methacrylic acid-allyloxyethyl ester (boiling point: 2 mmHg—64°-65° C., $n_D^{20}=1.4463$, specific gravity $d_4^{20}=0.982$) in the yield of about 80%.

About one mole of the above methacrylic acid-allyloxyethyl ester and $10^{-5}$ mole of a platinum catalyst are introduced into a three-neck flask equipped with a reflux condenser, a thermometer, an addition funnel and a stirrer. The flask is heated to about 75° C. and 1.1 mole of trichlorosilane is dropped thereinto. The reaction is carried out at 75°-80° C. while stirring. The unreacted methacrylic acid-allyloxyethyl ester and trichlorosilane are distilled off under reduced pressure, thereby providing methacryloxyethoxypropyl trichlorosilane.

0.3 mole of the above methacryloxyethoxypropyl trichlorosilane in 400 ml of dried diethyl ether is introduced into a three-neck flask equipped with a stirrer, a thermometer and a funnel. This solution is cooled to −50° C. in a cooling bath of dry ice and isopropanol. Under this condition, one mole of pyridine (about 11% excess) is added thereto over about 2.5 hours, and 1.2 mole of trimethylsilanol is added through the funnel. After the addition of trimethylsilanol, the temperature is raised to 30° C. and stirring is performed for 30 minutes.

Pyridinium-hydrochloride is filtered off, and the resulting filter cake is washed with diethyl ether. An ether solvent and the unreacted materials are distilled off under reduced pressure, and then the reaction product is washed with water. An upper organic phase is separated, dehydrated with anhydrous sodium sulfate, and decolorized with a proper amount of activated carbon. After the filtration with a membrane filter (0.2μ), methacryloxyethoxypropyl tris(trimethylsiloxy)silane ($n_D^{20}=1.4240$, boiling point 3 mmHg—150°-151° C.) represented by the following formula:

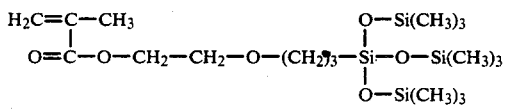

is obtained at the yield of 80%.

Figure 1:
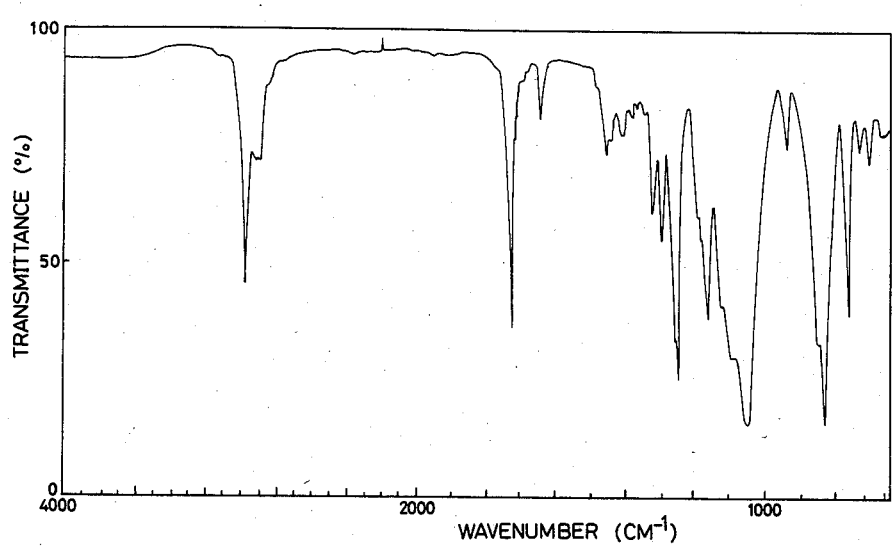
FIGS. 1 and 3 show the IR spectra of organosiloxanes.
Figure 2:
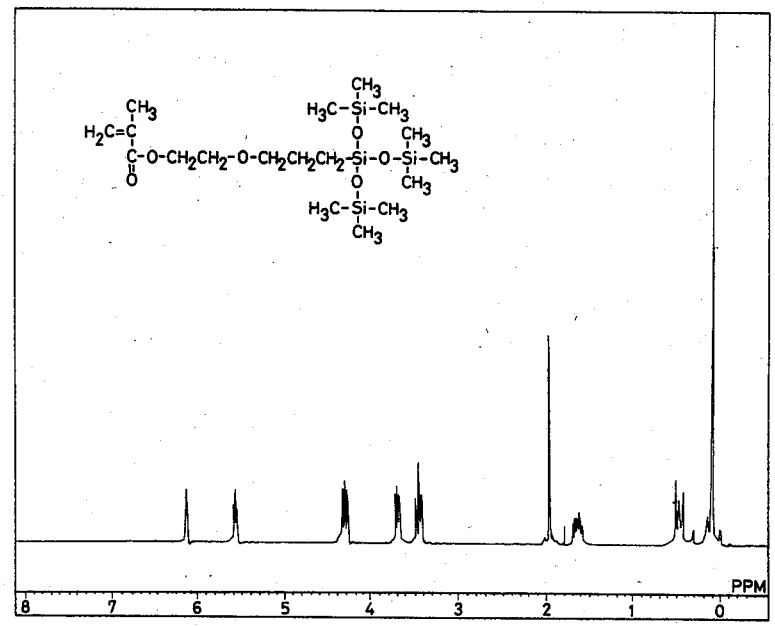
FIGS. 2 and 4 show the NMR spectra of organosiloxanes.

Methacryloxyethoxypropyl tris(trimethylsiloxy)silane shows IR and NMR spectra as shown in FIGS. 1 and 2.

For instance, methacryloxyethoxypropyl tetramethyltripropyl cyclotetrasiloxane may be prepared as follows:

First, methacrylic acid-allyloxyethyl ester is prepared in the same way as mentioned above, and about one mole of the above ester and $10^{-5}$ mole of a platinum catalyst are introduced into a three-neck flask equipped with a reflux condenser, a thermometer, an addition funnel and a stirrer. After the flask is heated to 90° C., about 1.1 mole of tetramethyltripropyl cyclotetrasiloxane is dropped thereinto. The reaction is performed while stirring at 90° C., and then the unreacted methacrylic acid-allyloxyester and tetramethyltripropyl cyclotetrasiloxane are distilled off under reduced pressure to obtain methacryloxyethoxypropyltetramethyltripropyl cyclotetrasiloxane ($n_D^{20}=1.4413$) represented by the following formula:

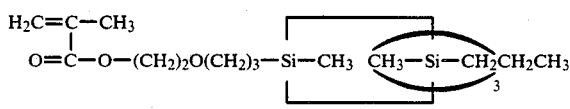

Figure 3:
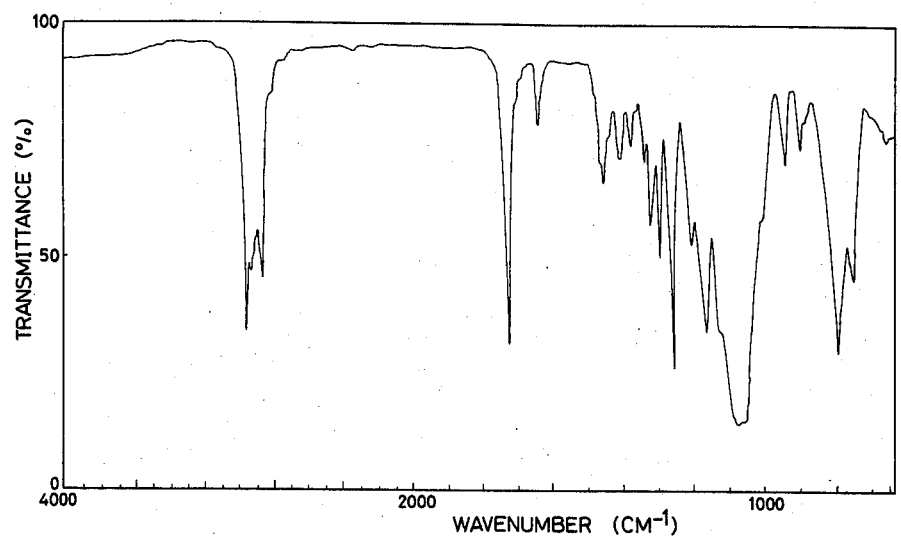
Figure 4:
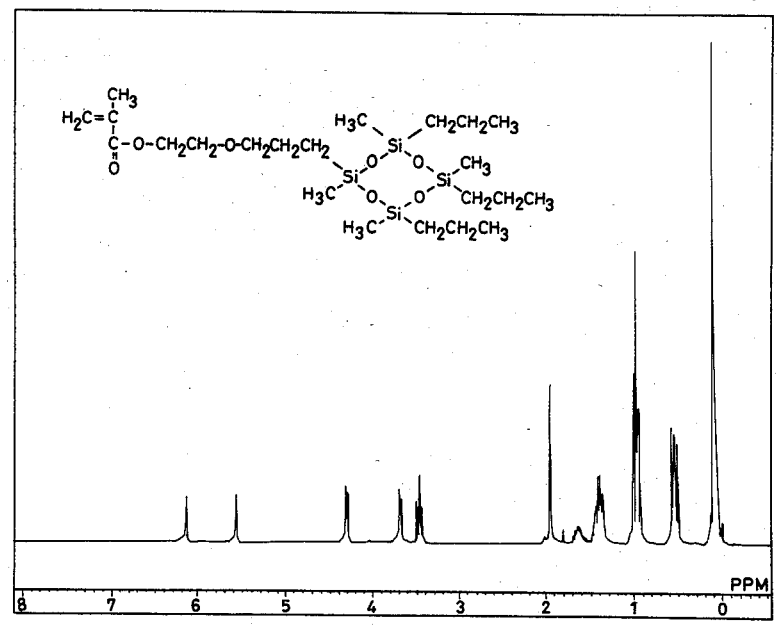

The IR and NMR spectra of the above compound are shown in FIGS. 3 and 4.

EXAMPLES 1-20

Various mixtures of 5-80 parts by weight of methacryloxyethoxypropyl tris(trimethylsiloxy)silane (hereinafter referred to as METS-1), 7-82 parts by weight of methylmethacrylate (hereinafter referred to as MMA) or dimethyl itaconate (hereinafter referred to as Di-MITA) as an ester of monoalcohol and methacrylic acid or itaconic acid, 8 parts by weight of methacrylic acid (hereinafter referred to as MA) as a hydrophilic monomer, and 5 parts by weight of triethyleneglycol dimethacrylate (hereinafter referred to as TGD), which is an ester of multi-valent alcohol and methacrylic acid, as a cross-linking agent are prepared. Each of the above mixtures is mixed with 0.01 parts by weight of a V-65 initiator [(tradename for 2,2'-azobis(2,4-dimethyl valero nitrile)], and the resulting mixture is poured into a cylindrical polymerization mold made of polypropylene, 16 mm in diameter and 10 mm in height. After the upper space of the mold is filled with nitrogen, the mold is kept at 40° C. for 20 hours in an oven filled with nitrogen. Thereafter, it is kept at 70° C. and 90° C. successively each for 10 hours. After that it is kept at 100° C. for 10 hours and the polymerization is terminated. Each procedure provides a transparent hard blank.

This blank is worked in a usual way to provide contact lenses.

The contact lenses thus obtained have the characteristics as shown in Tables 1 and 2.

TABLE 1

| Example | Monomer (wt. part) METS-1 | MMA | Hardness (Shore D) | Wetting Angle (Degree) | Oxygen Permeability |
|---|---|---|---|---|---|
| 1 | 5 | 82 | 92.1 | 64.3 | 1.0 |
| 2 | 10 | 77 | 89.0 | 67.3 | 2.1 |
| 3 | 20 | 67 | 88.2 | 69.5 | 5.3 |
| 4 | 30 | 57 | 87.1 | 74.2 | 10.7 |
| 5 | 40 | 47 | 86.0 | 75.1 | 14.3 |
| 6 | 45 | 42 | 85.0 | 77.8 | 18.0 |
| 7 | 50 | 37 | 78.0 | 80.6 | 22.5 |
| 8 | 60 | 27 | 76.0 | 86.1 | 33.8 |
| 9 | 70 | 17 | 71.2 | 89.0 | 42.0 |
| 10 | 80 | 7 | 70.3 | 93.1 | 59.0 |

Note*
Unit: $10^{-11}$ cc(STP) cm/cm$^2$ · sec · mmHg

TABLE 2

| Example | Monomer (wt. part) METS-1 | Di-MITA | Hardness (Shore D) | Wetting Angle (Degree) | Oxygen Permeability |
|---|---|---|---|---|---|
| 11 | 5 | 82 | 90.3 | 62.5 | 1.2 |
| 12 | 10 | 77 | 90.0 | 65.0 | 2.9 |
| 13 | 20 | 67 | 89.3 | 69.1 | 6.3 |
| 14 | 30 | 57 | 86.8 | 71.8 | 12.1 |
| 15 | 40 | 47 | 84.3 | 73.3 | 15.7 |
| 16 | 45 | 42 | 84.2 | 76.3 | 19.9 |
| 17 | 50 | 37 | 83.2 | 81.9 | 27.3 |
| 18 | 60 | 27 | 79.1 | 84.9 | 36.7 |
| 19 | 70 | 17 | 74.3 | 89.8 | 47.3 |
| 20 | 80 | 7 | 69.8 | 93.3 | 60.2 |

Note*
Unit: $10^{-11}$ cc(STP) cm/cm$^2$ · sec · mmHg

EXAMPLES 21-41

45 parts by weight of METS-1, 42 parts by weight of esters shown in Table 3, 8 parts by weight of MA as a hydrophilic monomer, 5 parts by weight of TGD, which is an ester of multi-valent alcohol and methacrylic acid, as a cross-linking agent and 0.03 parts by weight of V-601 (tradename for dimethyl-2,2'-azobisisobutylate) are used in the same manner as in Example 1 to obtain transparent, hard blanks. These blanks are worked to provide contact lenses. The contact lenses thus prepared have the characteristics as shown in Table 3.

TABLE 3

| Example | Monoalcohol Ester (wt. part) | Hardness (Shore D) | Wetting Angle (Degree) | Oxygen Permeability |
|---|---|---|---|---|
| 21 | EMA 42 | 85.8 | 77.8 | 18.0 |
| 22 | i-BMA 42 | 83.5 | 79.3 | 19.3 |
| 23 | C-HMA 42 | 80.1 | 77.7 | 17.5 |
| 24 | M-A 42 | 84.7 | 76.9 | 18.4 |
| 25 | P-A 42 | 83.2 | 77.9 | 17.6 |
| 26 | Mo-EITA 42 | 76.9 | 69.4 | 18.8 |
| 27 | Di-PeITA 42 | 75.1 | 71.3 | 19.1 |
| 28 | MMA 34, i-BMA 8 | 83.7 | 77.3 | 18.7 |
| 29 | MMA 27, i-BMA 15 | 80.9 | 77.8 | 19.0 |
| 30 | MMA 32, C-HMA 10 | 84.1 | 78.9 | 17.5 |
| 31 | MMA 32, C-HMA 20 | 83.5 | 79.1 | 18.1 |
| 32 | MMA 32, M-A 10 | 84.7 | 77.0 | 17.9 |
| 33 | MMA 32, H-A 10 | 81.5 | 77.0 | 19.1 |
| 34 | MMA 32, 2-EH-A 10 | 81.2 | 77.5 | 18.8 |
| 35 | MMA 32, Di-MITA 10 | 82.5 | 76.5 | 18.5 |
| 36 | MMA 32, Di-MITA 20 | 81.3 | 76.1 | 18.5 |
| 37 | MMA 32, Mo-2-EHITA 10 | 80.9 | 74.9 | 18.9 |
| 38 | MMA 32, i-BMA 5, M-A 5 | 83.8 | 78.0 | 17.7 |
| 39 | MMA 22, C-H-A 10, C-HMA 10 | 84.5 | 77.5 | 17.5 |
| 40 | EMA 32, C-HMA 5, Di-MITA 5 | 84.6 | 78.3 | 17.3 |
| 41 | EMA 32, t-BMA 5, Di-EITA 5 | 83.7 | 77.1 | 16.9 |

Note:
Unit of oxygen permeability: $10^{-11}$ cc(STP) cm/cm$^2$ · sec · mmHg
EMA: Ethyl methacrylate
i-BMA: Isobutyl methacrylate
M-A: Methyl acrylate
P-A: Pentyl acrylate
H-A: Hexyl acrylate
2-EH-A: 2-Ethylhexyl acrylate
C-H-A: Cyclohexyl acrylate
Mo-EITA: Monoethyl itaconate
Di-PeITA: Dipentyl itaconate
MMA: Methyl methacrylate
Mo-2-EHITA: Mono-2-ethylhexyl itaconate
EMA: Ethyl methacrylate
C-HMA: Cyclohexyl methacrylate
t-BMA: tert-butyl methacrylate
Di-EITA: Diethyl itaconate

EXAMPLES 42–64

30–60 parts by weight of various organosiloxanes, 27–57 parts by weight of esters of monoalcohol and acids selected from the group consisting of methacrylic acid, acrylic acid and itaconic acid, 8 parts by weight of MA, 5 parts by weight of TGD and 0.01 parts by weight of V-65 are used to form transparent, hard blanks in the same manner as in Example 1. The resulting blanks are worked to form contact lenses. The contact lenses thus prepared have the characteristics as shown in Table 4.

TABLE 4

| Example | Organosiloxane (wt. part) | Monoalcohol Ester (wt. part) | Hardness (Shore D) | Wetting Angle (Degree) | Oxygen Permeability |
|---|---|---|---|---|---|
| 42 | METS-1 45 | PMA 42 | 84.2 | 76.5 | 18.1 |
| 43 | METS-2 45 | MMA 42 | 85.1 | 76.3 | 15.5 |
| 44 | METS-3 45 | MMA 42 | 83.3 | 77.3 | 17.1 |
| 45 | METS-4 45 | MMA 42 | 85.0 | 78.3 | 18.2 |
| 46 | METS-5 45 | MMA 42 | 83.9 | 77.7 | 17.3 |
| 47 | METS-6 45 | MMA 42 | 84.9 | 76.9 | 15.1 |
| 48 | METS-7 45 | MMA 42 | 83.0 | 79.3 | 17.6 |
| 49 | METS-8 45 | MMA 42 | 79.9 | 79.4 | 20.3 |
| 50 | METS-9 45 | MMA 42 | 84.2 | 78.1 | 18.7 |
| 51 | METS-10 45 | MMA 42 | 84.2 | 78.4 | 20.1 |
| 52 | METS-11 45 | MMA 42 | 83.9 | 78.5 | 19.8 |
| 53 | METS-2 40 | MMA 35, i-BMA 12 | 85.0 | 76.0 | 14.2 |
| 54 | METS-3 45 | EMA 42 | 83.0 | 77.3 | 16.9 |
| 55 | METS-4 30 | M-A 57 | 87.3 | 72.8 | 10.3 |
| 56 | METS-4 50 | MMA 20, C-HMA 17 | 83.7 | 80.8 | 23.3 |
| 57 | METS-4 50 | MMA 27, Di-MITA 10 | 83.8 | 79.9 | 21.0 |
| 58 | METS-4 60 | MMA 17, C-HMA 10 | 77.8 | 84.3 | 30.9 |
| 59 | METS-7 45 | i-BMA 32, Di-EITA 10 | 83.0 | 77.5 | 18.2 |
| 60 | METS-11 50 | MMA 25, C-HMA 12 | 83.9 | 81.2 | 22.5 |
| 61 | METS-11 60 | MMA 15, C-HMA 12 | 77.8 | 85.1 | 31.6 |
| 62 | METS-1 25, METS-11 25 | MMA 27, EMA 10 | 81.7 | 80.1 | 23.0 |
| 63 | METS-1 20, METS-11 40 | MMA 22, C-HMA 5 | 75.9 | 85.9 | 34.3 |

TABLE 4-continued

| Example | Organosiloxane (wt. part) | Monoalcohol Ester (wt. part) | Hardness (Shore D) | Wetting Angle (Degree) | Oxygen Permeability |
|---|---|---|---|---|---|
| 64 | METS-1 30, METS-11 30 | MMA 22, Di-MITA 5 | 77.3 | 83.3 | 30.4 |

Note:
Unit of oxygen permeability: $10^{-11}$ cc(STP) cm/cm$^2$ · sec · mmHg
METS-2: Methacryloxyethoxypropylpentamethyl disiloxane
METS-3: Acryloxyethoxypropylheptamethyl trisiloxane
METS-4: Acryloxyethoxypropyltris (trimethyl siloxy) silane
METS-5: Methacryloxyethoxypropylphenyltetramethyl disiloxane
METS-6: Methacryloxyethoxypropyltribenzyldiethyl disiloxane
METS-7: Methacryloxyethoxypropyl n-pentylhexamethyl trisiloxane
METS-8: Methacryloxyethoxypropylphenyloctamethyl tetrasiloxane
METS-9: Methacryloxyethoxypropyltris (dimethyle cyclohexylsiloxy) silane
METS-10: Methacryloxyethoxypropylheptamethyl cyclotetrasiloxane
METS-11: Methacryloxyethoxypropyltetramethyl tripropyl cyclotetrasiloxane
PMA: Propyl methacrylate

EXAMPLES 65-83

30-60 parts by weight of various organosiloxanes, 52 parts by weight of EMA, an ester of monoalcohol and methacrylic acid, 5-35 parts by weight of esters of linear or branched fluoroalkyl alcohols or fluoroalkylbenzyl alcohols having 1-20 fluorine atoms and methacrylic acid, acrylic acid or itaconic acid, 8 parts by weight of MA, 5 parts by weight of TGD, 0.01 parts by weight of V-65 are used to form transparent, hard blanks in the same way as in Example 1. The resulting blanks are worked to form contact lenses. The organic lenses thus prepared have the characteristics as shown in Table 5.

TABLE 5

| Example | Organosiloxane (wt. part) | EMA (wt. part) | Fluoroalcohol Ester (wt. part) | Hardness (Shore D) | Wetting Angle (Degree) | Oxygen Permeability |
|---|---|---|---|---|---|---|
| 65 | METS-1 30 | 52 | FM-1 5 | 86.3 | 75.0 | 11.2 |
| 66 | METS-1 30 | 47 | FM-1 10 | 84.6 | 76.6 | 12.0 |
| 67 | METS-1 30 | 37 | FM-1 20 | 83.8 | 80.6 | 15.1 |
| 68 | METS-1 30 | 27 | FM-1 30 | 83.2 | 82.4 | 16.5 |
| 69 | METS-1 30 | 7 | FM-1 50 | 81.3 | 85.2 | 20.8 |
| 70 | METS-1 30 | 37 | FM-2 20 | 81.5 | 84.8 | 16.1 |
| 71 | METS-1 30 | 37 | FM-3 20 | 77.6 | 85.6 | 16.9 |
| 72 | METS-1 30 | 37 | FM-4 20 | 82.3 | 80.3 | 15.8 |
| 73 | METS-1 30 | 37 | FM-5 20 | 80.4 | 79.8 | 14.8 |
| 74 | METS-1 30 | 37 | FA-1 20 | 83.1 | 80.4 | 15.3 |
| 75 | METS-1 30 | 37 | FA-4 20 | 78.5 | 82.8 | 15.8 |
| 76 | METS-1 30 | 37 | FMI-1 20 | 81.1 | 80.9 | 15.3 |
| 77 | METS-1 30 | 37 | FMI-1 20 | 82.1 | 78.8 | 15.0 |
| 78 | METS-1 45 | 32 | FM-1 10 | 83.9 | 79.0 | 19.0 |
| 79 | METS-1 60 | 17 | FM-1 10 | 76.2 | 86.8 | 36.0 |
| 80 | METS-4 45 | 32 | FA-1 10 | 83.5 | 79.3 | 19.7 |
| 81 | METS-11 45 | 32 | FM-2 10 | 82.4 | 80.1 | 20.1 |
| 82 | METS-1 25, METS-11 25 | 27 | FM-1 10 | 82.5 | 82.3 | 25.3 |
| 83 | METS-1 45 | 32 | FM-1 5, FM-1 5 | 83.3 | 78.0 | 19.2 |

Note:
FM-1: 2,2,2-trifluoroethyl methacrylate
FM-2: 2,2,3,3-tetrafluoropropyl methacrylate
FM-3: 1H,1H,2H,2H—heptedecafluorodecyl methacrylate
FM-4: Hexafluoroisopropyl methacrylate
FM-5: p-trifluoromethylbenzyl methacrylate
FA-1: 2,2,2-trifluoroethyl acrylate
FA-4: 1H,1H—heptefluorobutyl acrylate
FDI-1: Bis-2,2,2-trifluoroethyl itaconate
FMI-1: 2,2,2-trifluoroethyl itaconate

EXAMPLES 84-103

35-60 parts by weight of various organosiloxanes, 10-37 parts by weight of esters of monoalcohols and methacrylic acid, acrylic acid or itaconic acid, 20 parts by weight or less of esters of fluoroalkyl alcohols or fluoroalkylbenzyl alcohols and methacrylic acid, acrylic acid or itaconic acid, 5-10 parts by weight of diesters, triesters or tetraesters of multi-valent alcohol and methacrylic acid or acrylic acid as cross-linking agents, 5-16 parts by weight of hydrophilic monomers, which are monoesters of multi-valent alcohols and methacrylic acid or acrylic acid, monoesters of monoalcohols and itaconic acid, monoesters of fluoroalkyl alcohols or fluoroalkylbenzyl alcohols and itaconic acid, methacrylic acid, acrylic acid or N-vinylpyrrolidone, and 0.01 parts by weight of a free radical initiator are used to form transparent, hard blanks in the same way as in Example 1. The resulting blanks are worked to form contact lenses. The contact lenses thus prepared have the characteristics as shown in Table 6.

TABLE 6

| Example | Organo-siloxane (wt. part) | Ester*1 (wt. part) | Ester*2 (wt. part) | Cross-linking Agent (wt. part) | Hydrophilic Monomer (wt. part) | Free Radical Initiator (wt. part) | Hardness (Shore D) | Wetting Angle (Degree) | Oxygen Permeability |
|---|---|---|---|---|---|---|---|---|---|
| 84 | METS-1 45 | EMA 31 | FM-1 8 | EDMA 8 | MA 8 | V-65 | 84.9 | 80.0 | 19.9 |
| 85 | METS-1 45 | EMA 31 | FM-1 8 | DED-A 8 | MA 8 | V-601 | 84.6 | 79.4 | 20.4 |
| 86 | METS-1 45 | M-A 31 | FM-1 8 | 1, 4-BOMA 8 | MA 8 | V-70 | 83.9 | 78.5 | 21.6 |
| 87 | METS-1 50 | PMA 36 | FM-1 8 | TGD 8 | EGMA 10 | AIBN | 78.9 | 84.3 | 24.2 |
| 88 | METS-1 50 | PMA 36 | FM-1 8 | TGDA 8 | TEGM-A 10 | V-65 | 79.9 | 85.3 | 22.5 |
| 89 | METS-4 45 | Di-MITA 31 | FM-2 8 | TMP 8 | AA 8 | V-65 | 84.0 | 80.2 | 20.3 |
| 90 | METS-4 45 | EMA 31 | FM-2 8 | PET-A 8 | AA 8 | V-65 | 84.3 | 79.6 | 20.0 |
| 91 | METS-1 48 | EMA 24, Di-MITA 10 | FM-3 5 | TMP 8 | N—VP 5 | BZPO | 81.3 | 80.7 | 23.9 |
| 92 | METS-2 50 | MMA 20, i-BMA 10 | FDI-1 8 | TMP 7 | N—VP 5 | V-65 | 81.1 | 82.3 | 26.0 |
| 93 | METS-11 50 | MMA 20, C-HMA 4 | FDI-3 8 | TEGD 8 | 2-HPMA 10 | V-65 | 82.0 | 84.5 | 25.3 |
| 94 | METS-11 45 | MMA 10, i-P-A 10 | FDI-2 20 | TMP 5 | MA 10 | V-65 | 83.8 | 82.3 | 24.2 |
| 95 | METS-11 50 | PMA 16, Di-EITA 10 | FM-1 8 | TGD 8 | MA 8 | V-65 | 78.9 | 79.1 | 25.0 |
| 96 | METS-11 55 | MMA 14, C-HMA 15 | — | TGD 8 | MA 8 | V-65 | 77.3 | 83.5 | 27.3 |
| 97 | METS-1 60 | EMA 10 | FM-1 10 | TMP 10 | AA 8 | V-65 | 74.8 | 88.3 | 37.9 |
| 98 | METS-1 40 | PMA 27 | FA-2 8, FM-2 8 | TMP 7 | MA 10 | V-65 | 85.3 | 80.7 | 18.2 |
| 99 | METS-1 55 | MMA 9, Di-EITA 20 | — | TGD 8 | MA 8 | V-65 | 78.5 | 82.9 | 28.8 |
| 100 | METS-1 50 | EMA 26 | FA-2 8 | TGD 8 | MA 8 | V-65 | 80.1 | 82.0 | 23.9 |
| 101 | METS-1 45 | MMA 29 | FDI-1 8 | TGD 8 | Mo-EITA 10 | V-65 | 83.2 | 79.9 | 20.0 |
| 102 | METS-1 35 | EMA 37 | FM-1 10 | TGD 8 | FMI-2 10 | V-65 | 85.7 | 77.0 | 15.0 |
| 102 | METS-1 55 | MMA 21 | — | TMP 8 | AA 8 / FMI-1 8 | V-65 | 78.6 | 82.0 | 28.9 |

Note:
Unit of oxygen permeability: $10^{-11}$ cc(STP) cm/cm$^2$ · sec · mmHg
Ester*1: Ester or diester of monoalcohol and methacrylic acid or acrylic acid, or itaconic acid
Ester*2: Ester or diester of fluoroalkyl alcohol or fluoroalkylbenzyl alcohol and methacrylic acid or itaconic acid
i-P-A: Isopropyl acrylate
FDI-2: Bis-2,2,3,3-tetrafluoropropyl itaconate
FDI-3: Bis-1H,1H—pentadecafluorooctyl itaconate
FA-2: 2,2,3,3-tetrafluoropropyl acrylate
EDMA: Ethyleneglycol dimethacrylate
DED-A: Diethyleneglycol diacrylate
1,4-BOMA: 1,4-butanediol dimethacrylate
TGD-A: Triethyleneglycol diacrylate
M-A: Methyl acrylate
PMA: Propyl methacrylate
TMP: Trimethlolpropane trimethacrylate
PET-A: Penta erythritol tetracrylate
TEGD: Tetraethyleneglycol dimethacrylate
EGMA: Ethyleneglycol monomethacrylate
TEGM-A: Tetraethyleneglycol monoacrylate
AA: Acrylic acid
N—VP: N—vinyl-2-pyrrolidone
2HPMA: 2-hydroxypropyl methacrylate
FMI-2: o-trifluoromethylbenzyl itaconate

We claim:

1. An oxygen-permeable hard contact lens material which is a copolymer formed by the reaction of:
   (a) an organosiloxane represented by one of the formulae:

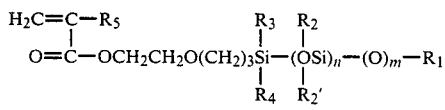

or

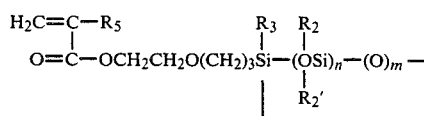

wherein $R_1$ is selected from the group consisting of $C_1$-$C_6$ alkyl groups and phenyl groups; $R_2$ and $R_2'$ are selected from the group consisting of $C_1$-$C_6$ alkyl groups and phenyl groups; $R_3$ and $R_4$ are selected from the group consisting of $C_1$-$C_6$ alkyl groups, Phenyl groups and

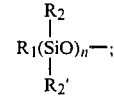

$R_5$ is $CH_3$ or H; m is 0 or 1;
   and n is an integer from 1 to 3; and
   (b) an ester of $C_1$-$C_{10}$ monohydroxy or polyhydroxy alcohol and an acid selected from the group consisting of methacrylic acid, acrylic acid and itaconic acid.

2. A contact lens material according to claim 1, wherein said organosiloxane is 5-80 parts by weight and said ester is 10-95 parts by weight.

3. A contact lens material according to claim 2, wherein said copolymer further includes ester of linear or branched fluoroalkyl or fluoroalkylbenzyl alcohol having 1-20 fluorine atoms and acid selected from the group consisting of methacrylic acid, acrylic acid and itaconic acid.

4. The oxygen-permeable hard contact lens material according to claim 2, wherein said copolymer further includes at least one hydrophilic monomer selected from the group consisting of methacrylic acid, acrylic acid, acrylamide, methacrylamide, N-methylol methacrylamide and N-vinyl pyrrolidone.

5. A contact lens material according to claim 4, wherein said hydrophilic monomer is about 5-10 parts by weight per 5-80 parts by weight of said organosiloxane.

* * * * *